United States Patent
Einamo

(10) Patent No.: US 7,826,823 B1
(45) Date of Patent: Nov. 2, 2010

(54) TRACING OF SIGNALLING MESSAGES

(75) Inventor: Kari Einamo, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/762,922

(22) PCT Filed: Aug. 16, 1999

(86) PCT No.: PCT/FI99/00676

§ 371 (c)(1),
(2), (4) Date: Feb. 14, 2001

(87) PCT Pub. No.: WO00/11902

PCT Pub. Date: Mar. 2, 2000

(30) Foreign Application Priority Data

Aug. 18, 1998 (FI) ..................... 981773

(51) Int. Cl.
*H04M 1/66* (2006.01)
*H04M 11/00* (2006.01)
*H04M 15/00* (2006.01)

(52) U.S. Cl. ............ 455/410; 455/405; 455/406; 455/408; 379/114.14

(58) Field of Classification Search ........... 455/461, 455/456.1, 456.2, 456.3, 456.5, 405, 406, 455/408, 67.11; 379/112.01, 114.14
See application file for complete search history.

(56) References Cited

U.S. PATENT DOCUMENTS

| 5,592,530 | A | | 1/1997 | Brockman et al. | |
|---|---|---|---|---|---|
| 5,732,127 | A | * | 3/1998 | Hayes | 379/114.28 |
| 5,734,977 | A | * | 3/1998 | Sanmugam | 455/410 |
| 5,793,752 | A | * | 8/1998 | Clarke et al. | 370/252 |
| 6,009,321 | A | * | 12/1999 | Wang et al. | 455/410 |
| 6,088,587 | A | * | 7/2000 | Abbadessa | 455/424 |
| 6,091,950 | A | * | 7/2000 | Remy | 455/423 |
| 6,137,876 | A | * | 10/2000 | Wong et al. | 379/246 |
| H1921 | H | * | 11/2000 | Fletcher et al. | 455/433 |
| 6,157,833 | A | * | 12/2000 | Lawson-Jenkins et al. | 455/436 |
| 6,456,845 | B1 | * | 9/2002 | Drum et al. | 455/424 |
| 7,151,772 | B1 | * | 12/2006 | Kalmanek et al. | 370/390 |
| 7,274,662 | B1 | * | 9/2007 | Kalmanek et al. | 370/230 |
| 2003/0012196 | A1 | | 1/2003 | Ramakrishnan | |

(Continued)

FOREIGN PATENT DOCUMENTS

EP 0570643 A1 11/1993

(Continued)

OTHER PUBLICATIONS

NPL, Japanese Office Action with English translation dated Dec. 1, 2008 for corresponding Japanese applicaiton 2000-567045, 4 pp.

*Primary Examiner*—Un C Cho
(74) *Attorney, Agent, or Firm*—Harrington & Smith

(57) ABSTRACT

A method, system and network element for tracing signaling messages related to a subscriber in a mobile communication system. In the solution according to the invention a functional entity of the mobile communication system receives a trace command which indicates the tracer and identifies at least one subscriber whose signaling messages are to be traced, and tracing is started, tracing comprising the steps of: copying the signaling message in response to reception or transmission of a signaling message related to the subscriber to be traced, and sending a copy to the tracer.

16 Claims, 2 Drawing Sheets

U.S. PATENT DOCUMENTS

2006/0002340 A1 * 1/2006 Criss et al. .................. 370/328

FOREIGN PATENT DOCUMENTS

| | | |
|---|---|---|
| JP | 6070374 | 3/1994 |
| JP | 65106452 | 11/1994 |
| WO | 9401977 A1 | 1/1994 |
| WO | WO 95/29554 | 11/1995 |
| WO | WO 96/15643 | 5/1996 |

* cited by examiner

TRACING OF SIGNALLING MESSAGES

This is the national phase of international application PCT/FI99/00676 filed Aug. 16, 1999 which designated the U.S.

BACKGROUND OF THE INVENTION

The invention relates to tracing of signalling messages related to a subscriber in a mobile communication system, and particularly to tracing signalling messages of a specific subscriber.

Mobile communication systems have been developed because it has been necessary to be able to reach people even when they are not close to a fixed telephone terminal. The most important service provided by the mobile communication system is that the subscriber can make a call or he can be called, regardless of the subscriber's location in the coverage area of the system. Besides the mobile communication systems, the supplementary services provided through mobile stations have also developed. Most of these supplementary services are also available when the mobile subscriber roams from one network to another. To provide the services, the network elements or processes of the mobile communication system have to exchange information on the subscriber. This information is exchanged using signalling messages. Situations in which the subscriber cannot access the desired service or the service does not function as it should are relatively common. Causes of faults are searched for by tracing signalling messages related to the subscriber. In the pan-European mobile communication system GSM (Global System for Mobile Communications), for example, tracing is in practice carried out by taking snap shots from the signalling message flow and by analyzing their contents. A snap shot is a temporally limited sample from all signalling between the network elements or processes that are monitored.

The problem related to the arrangement described above is that as the signalling load increases, the buffers reserved for snap shots fill up rather quickly, and thus it is probable that the snap shots contain only some of the necessary messages or no necessary messages at all. Even if the signalling load were small, it would not be possible to ensure in any way that the snap shot contains the signalling messages that are to be traced. A further problem is that snap shots are usually rather large in size, and thus it takes a lot of time and effort to separate necessary messages from the unnecessary messages.

BRIEF DESCRIPTION OF THE INVENTION

An object of the invention is to provide a method and an apparatus implementing the method to eliminate the above-mentioned problems. The objects are achieved with a method according to the invention which comprises transmitting and receiving signalling messages in a functional entity, which is an entity for subscriber mobility management in a mobile communication system, the method being characterized in that said functional entity receives a trace command which indicates the tracer and identifies at least one subscriber whose signalling messages are to be traced, and tracing is started, tracing comprising the following steps:

copying a signalling message in response to reception or transmission of the signalling message related to the subscriber to be traced, and sending a copy to the tracer.

Here the term 'tracer' refers to the network address or memory address to which copied signalling messages are sent or in which they are stored.

The invention also relates to a system where the method of the invention can be employed. The system of the invention comprises subscribers, at least some of the subscribers being able to roam within the coverage area of the system, one or more network elements which receive and transmit signalling messages to manage subscriber mobility, and operating means for giving instructions to the network element. The system is characterized in that the operating means are arranged to give a trace command to the network element, the command indicating the tracer and identifying at least one subscriber whose signalling messages are to be traced, and the network element is arranged to copy signalling messages related to the subscriber to be traced in response to the trace command and to send a copy to the tracer.

The invention further relates to a network element which can be utilized in the method of the invention. The network element of the invention, which receives and transmits signalling messages to manage subscriber mobility, is characterized in that the network element comprises reception means for receiving the trace command which indicates the tracer and identifies at least one subscriber to be traced whose signalling messages are to be traced, separation means for separating the signalling messages of the subscriber to be traced from other signalling messages, copying means for copying the signalling messages of the subscriber to be traced, and transmission means for sending copies to the tracer.

The invention is based on the idea that the network element or process is informed of the subscriber whose messages are to be monitored. After this the network or process automatically carries out monitoring and copies only messages related to this subscriber and sends copies to the desired address where the tracer is. The most important advantage of the invention is that all desired signalling messages can be obtained regardless of the lapse between the messages or whether the messages are sent during a snap shot; not even a single desired message is missed nor is it necessary to search for messages from a large group of irrelevant messages. Furthermore, it is easy to find messages related to one another because they need not be searched from a large group of messages. Usually messages related to one another are successive, and thus it is easy to find them; after all, the messages are sent to the tracer in reception and transmission order. Yet another advantage of the invention is that sending the trace command leads to immediate starting of the tracing. Therefore the fault is discovered as quickly as possible.

In a preferred embodiment of the invention the desired type of the message is also indicated, e.g. messages related to a mobile-terminating call. This has the advantage that the desired messages can be defined more accurately, which makes it even easier to search for the cause of the fault.

In a preferred embodiment of the invention tracing is performed one dialogue at a time. In this case it is advantageous that the messages are obtained as a whole, and thus we do not need to guess what the preceding messages contain.

In a preferred embodiment of the invention copying of messages is not finished until a specific stop command has been received. This has the advantage that the tracer may finish tracing immediately after it has received sufficiently many messages for finding out the fault. If a certain number of messages were always copied, this could lead to copying of too many or too few messages, depending on the case.

Preferred embodiments of the method, system and network element of the invention are disclosed in the appended dependent claims.

BRIEF DESCRIPTION OF THE DRAWINGS

The invention will be described in greater detail by means of preferred embodiments with reference to the accompanying drawings, in which.

DETAILED DESCRIPTION OF THE INVENTION

The present invention is applicable to any mobile communication system which supports mobility, such as the third generation mobile communication systems that are under development, e.g. UMTS (Universal Mobile Telecommunication System) and IMT-2000 (International Mobile Telecommunication 2000). In the following the invention is described in greater detail by examples in connection with the GSM system, but the invention is not, however, limited to this particular system.

Figure 1:
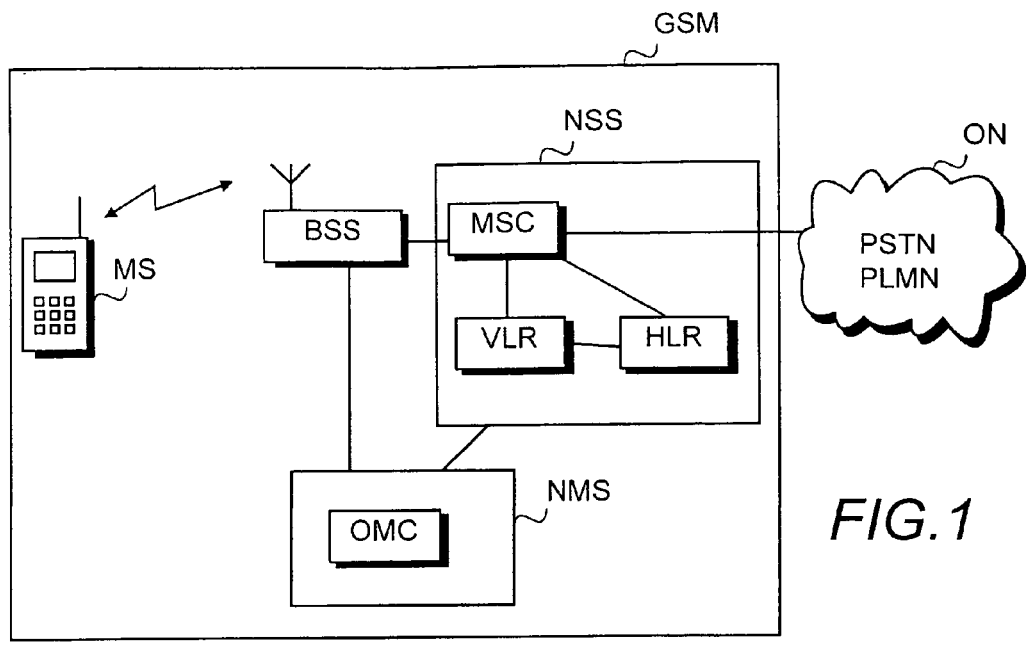
FIG. 1 illustrates a mobile communication system.

FIG. 1 is a simplified block diagram of the GSM system. In the figure all functional elements of the GSM system are located in network elements which have the same names. Functional elements may also be integrated, i.e. placed in the same network element. In that case a functional element is often called a process. At least a mobile switching centre MSC, visitor location register VLR and home location register HLR are in charge of subscriber services. These are the central functional entities in respect of mobility management, controlling and signalling. They are responsible for roaming, for example. This is a characteristic of the mobile communication network which enables correct call routing when the mobile subscriber roams from one network or cell to another. For example, roaming guarantees that a call is not interrupted when the mobile user drives from the area of the cell of one base station to the area of another base station. As regards a more detailed description of the GSM system, reference is made to *The GSM System for Mobile Communications*, M. Mouly and M. Pautet, Palaiseau, France 1992, ISBN:2-9507190-07-7.

Referring to FIG. 1, the network of the GSM system comprises a base station subsystem BSS and a network subsystem NSS. A mobile station MS is connected to the base station system BSS via a radio path, the base station system being connected to a mobile switching centre MSC. The mobile switching centre is responsible for switching calls in which at least one mobile station MS is involved. The mobile switching centre MSC is in contact with other mobile switching centres. Some mobile switching centres MSC are connected to other telecommunications networks ON, such as other public land-based mobile networks PLMN or the public switched telephone network PSTN, and they comprise interconnecting functions for switching calls to and from the networks. The most essential difference between the mobile switching centre MSC and the exchange of a fixed network is that the mobile switching centre also has to perform functions characteristic of mobile communication systems only. For example, the mobile switching centre has to consider the influence of radio resource allocation and manage subscriber mobility together with the network registers. Consequently, the mobile switching centre has to carry out certain procedures, such as procedures related to location registration and changeover.

Two types of databases, i.e. registers, are related to call routing. Information on all subscribers in the network is stored permanently or semi-permanently in the home location register HLR, including information on the services the subscriber has access to and the subscriber's current location. The subscriber information comprises e.g. a subscriber identifier, i.e. IMSI (International Mobile Subscriber Identity), and the subscriber's telephone number MSISDN. One IMSI may have several telephone numbers.

The visitor location register VLR is usually connected to one mobile switching centre MSC, but it may also serve several centres. The visitor location register VLR can be integrated into the mobile switching centre MSC. Such an integrated network element is called a visited mobile switching centre MSC/VLR. When the mobile station MS is active (i.e. it has registered with the network and can make or receive a call), most of the subscriber information related to the mobile station MS and included in the home location register HLR is loaded (copied) into the visitor location register VLR of the mobile switching centre MSC in the area of which the mobile station MS is. The information the VLR has on the mobile station includes the IMSI, MSISDN and location area in which the mobile station is registered, and parameters of supplementary services. The VLR needs this information to process calls which terminate to or originate from the mobile station included in its registers.

The quality of services provided by the network is monitored in a network management subsystem NMS, or to be more precise, in an operation and maintenance centre OMC located in the NMS. From the operation and maintenance centre OMC the network operator can monitor the function of the network elements and change different network parameters. Operation and maintenance units OMU located in the network elements function as interfaces between the network element and the operator. There is a man machine interface MMI between the operation and maintenance centre and the OMU unit. The operator can give local or remote-controlled commands to the network elements through this interface. The operation and maintenance centre may also comprise smaller operation and maintenance centres, one of them being the main operation and maintenance centre.

In addition to prior art monitoring means, the mobile communication system implementing the functionality of the present invention also comprises means for tracing signalling messages, i.e. means for receiving a trace command, means for detecting the messages to be traced from a group of messages, means for copying the message to be traced and means for sending a copy to the tracer. Implementation of these means does not require changes to the equipment because the existing network elements comprise processors and memory which the functions of the invention can employ. All changes needed to implement the invention can be carried out by adding or updating software routines in the network elements which comprise functions, according to the invention.

The mobile communication system uses a mobile application part MAP for transmitting mobile network specific information between the different entities of the same mobile communication network and between the entities in different mobile communication networks. The MAP protocol is a general name for protocols between the functional elements, and MAP protocols are usually processed as a single protocol. The different network elements or processes must support the MAP protocol to exchange the necessary information so that mobile services can be transmitted. If the functional elements are integrated into the same network element, they must use the MAP protocol for external communication, and thus they also preferably use the MAP protocol in their internal communication. In their internal data transmission the functional elements can alternatively use another protocol which is, however, used for performing the functions the mobile application part MAP requires.

Figure 2:
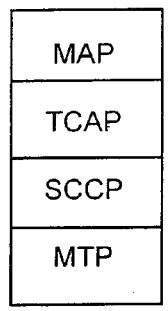
FIG. 2 illustrates an MAP protocol stack.

An MAP protocol stack according to the GSM system is illustrated in FIG. 2. The MAP protocol consists of a number of services the provider of the MAP service, i.e. an MAP entity, offers to the users of MAP services. The users of the MAP service interact with the MAP entity by transmitting or receiving MAP service primitives at the service interface. The MAP service is used by applications which are run above the MAP protocol, such as call control CC, supplementary service SS, mobility management MM and radio resource control RR. In the GSM system all MAP protocols use the services of a TCAP protocol (Transaction Capabilities Application Part) of signalling system SS7, and the TCAP protocol uses services of the SCCP protocol (Signalling Connection Control Part) of SS7. All these protocols use signalling transfer which is provided by the MTP protocol (Message Transfer Part) of the lowest layer. In other mobile communication systems the MAP protocols may use protocols of other signalling systems than SS7.

Figure 3:
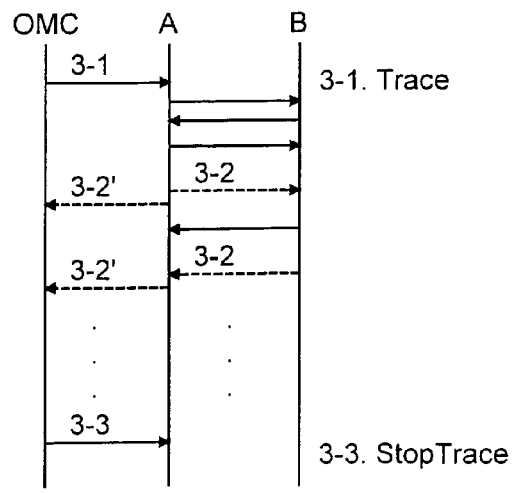
FIG. 3 illustrates signalling according to the invention.

FIG. 3 illustrates signalling according to the first preferred embodiment of the invention. If in the example illustrated in FIG. 3 the signalling between A and B occurs in the same network element, it is signalling between processes, i.e. functional elements. If A and B are located in different network elements, signalling occurs between network elements. In both cases network elements receive and transmit messages. A received message means a message received in the signalling between two network elements, and a transmitted message means a message transmitted from a network element. If internal signalling of a network element is involved, in the first preferred embodiment one of the processes is chosen as the process whose received and transmitted messages are monitored. In another embodiment both processes can be monitored. In the example of FIG. 3, A denotes a single network element or process, whereas B represents all networks or processes A has a dialogue with. A may be e.g. an MSC which has a dialogue with the VLR and the HLR. B represents these other parties of the dialogue in FIG. 3.

Referring to FIG. 3, the operation and maintenance centre OMC gives either a local or a remote-controlled trace command to A in signalling message 3-1 (Trace). The signalling message comprises at least the information required for identifying the subscriber, such as the mobile subscriber identifier IMSI or the subscriber's telephone number MSISDN. It is also possible to use other subscriber identifiers, such as a temporary identifier TMSI. If signalling messages of several subscribers are to be traced, the signalling message 3-1 may include separate identification data of each subscriber or only e.g. the first three digits of the telephone number, in which case signalling messages of each subscriber whose telephone number begins correspondingly are traced. The signalling message 3-1 also indicates the tracer. Depending on the embodiment, the signalling message either always includes the tracer's address or the fact that the address is missing indicates that a default tracer is used or the tracer is the sender of the send command. The tracer may be an element in the operation and maintenance centre OMC, and traced messages are sent to the address of this element. The tracer's address may also be a record in the memory of the network element, from which the information is loaded e.g. into the OMC centre or into a computer at the network element using a separate command. The tracer is by no means connected with the element which gives the trace command, although usually the element that gives the trace command also functions as the tracer. The signalling message 3-1 may also contain information on the desired message type, e.g. signalling related to a call terminating to the subscriber's mobile station.

After A has received message 3-1, it writes down the subscriber, the tracer and the possible message type in its monitoring table. A monitoring table is described in greater detail in connection with FIG. 5. Then A starts to monitor the messages it has received and transmitted in a manner to be explained more closely in connection with FIG. 4. When it detects a message 3-2 to be traced, it copies it and sends the copy 3-2' to the tracer, which is the OMC in the example of FIG. 3. In the first preferred embodiment of the invention A continues monitoring and copying until it receives a command to stop tracing from the OMC in message 3-3 (Stop-Trace). The stop command contains all the information A needs in order to know which trace is to be stopped. In the first preferred embodiment of the invention message 3-3 includes the same parameters as message 3-1. If message 3-1 identifies more than one subscriber, tracing can be stopped one subscriber at a time. If several tracers have asked to trace messages related to the same subscriber, tracing is preferably stopped one tracer at a time.

Having received message 3-3, A removes the subscriber or subscribers indicated in the message from the monitoring table and stops tracing of their messages.

In another preferred embodiment of the invention the trace command 3-1 is always valid for the duration of one dialogue. When the dialogue ends, A removes the message from the monitoring table and message 3-3 is not needed.

The signalling messages described above in connection with FIG. 3 are only exemplary and may contain several different messages for transmitting the same information. The messages may also contain other data and they may be combined freely. Furthermore, the names of the messages may change. In addition, other messages, such as acknowledgement messages of messages 3-1 and 3-3, may be transmitted between these messages.

Figure 4:
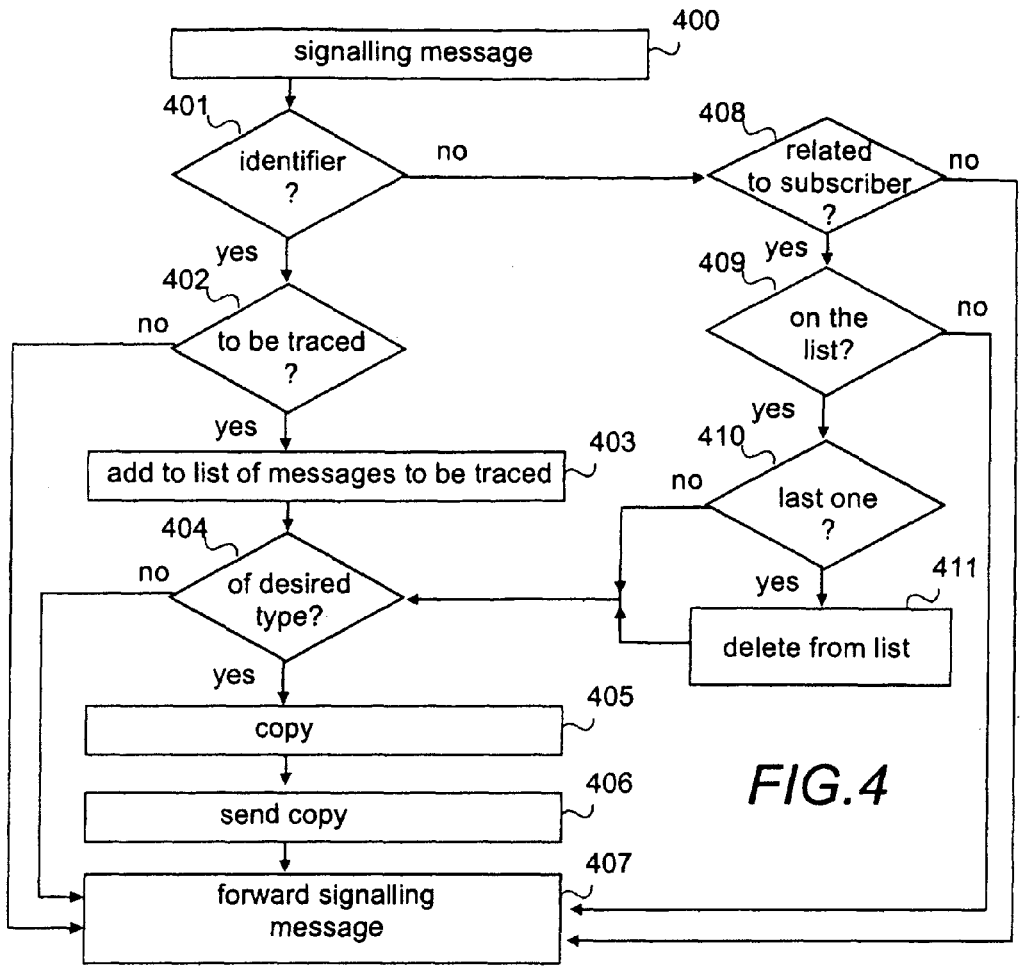
FIG. 4 is a flow chart of the function according to a first preferred embodiment of the invention.

FIG. 4 illustrates function according to the first preferred embodiment of the invention in a network element which has received a trace command related to a certain subscriber and to messages of a certain type, e.g. signalling messages related to a mobile-terminating call. In the first preferred embodiment of the invention tracing of signalling messages starts as a dialogue begins. An MAP dialogue is defined as an alternative between two MAP users so that the task can be completed. If the MAP dialogue is related to a specific subscriber, the subscriber's identification data is usually transmitted in the first MAP message. In some cases, e.g. in signalling of phase 2 related to short messages, the subscriber's identification data is not transmitted until in the second MAP message. In these cases the second message is regarded as the starting message of the dialogue related to the subscriber. Messages of different types can be transmitted during the MAP dialogue. At its shortest the dialogue comprises the first message and its acknowledgement.

Referring to FIG. 4, a signalling message is received and transmitted in step 400, and in step 401 it is checked whether the message initiates a dialogue, i.e. whether it includes the subscriber's identification data. The subscriber is identified in the MAP messages using either a subscriber identifier IMSI or a telephone number MSISDN. If the signalling message includes an identifier, it initiates the dialogue. In that case it is checked in step 402 whether the dialogue is to be traced, i.e. whether the subscriber is included in the monitoring table, which is described in greater detail in connection with FIG. 5. If the dialogue is to be traced, it will be added to the list of dialogues to be traced in step 403. Then it is checked in step 404 whether the message is of the desired type. If the message is of the desired type, the signalling message is copied in step 405 and a copy is sent to the tracer in step 406. The tracer's address and possibly the desired message type are obtained from the monitoring table and this information may be copied into the list of dialogues to be traced. Then we proceed to step 407 where the signalling message is forwarded according to the prior art. Forwarding means that a received message is transferred for processing and a message to be transmitted is transmitted to the other party of the dialogue.

If it is detected in step 401 that the message does not include an identifier, it is checked in step 408 whether the message belongs to a dialogue related to the subscriber, i.e. whether it is related to the subscriber. If the message does not belong to a dialogue related to the subscriber, we proceed to step 407 where the message is forwarded. If the dialogue belongs to a dialogue related to the subscriber, we proceed to step 409 where it is checked whether the dialogue is on the list of the dialogues to be traced. If this is not the case, we proceed to step 407 where the message is forwarded. If the dialogue is on the list of dialogues to be traced, it is checked in step 410 whether the message stops the dialogue, i.e. whether it is the last message. If the message is not the last message, we return to step 404 to check whether the message is a desired message. If the message is the last message, we proceed to step 411 where the dialogue is removed from the list of dialogues to be traced, after which we return to step 404. In an embodiment where tracing is carried out during one dialogue only, information is also deleted from the monitoring table in step 411.

If it is detected in step 402 that the message is not of the desired type, we proceed to step 407 where the signalling message is forwarded. If several trace requests were related to the same subscriber, the check of step 404 and the following actions are carried out one trace request at a time.

The steps illustrated in FIG. 4 are not in absolute chronological order and some of the steps can be performed simultaneously or deviating from the chronological order described. Other functions may also be performed between the steps. Some of the steps, e.g. the check in step 404, can also be omitted. In some embodiments copying can be started in the middle of a dialogue. In that case the dialogue has to be linked with the subscriber differently from what was described above. It is essential that received and transmitted signalling messages are monitored and the message or messages related to the subscriber are picked from among them and a copy of the message is sent to the tracer.

Figure 5:
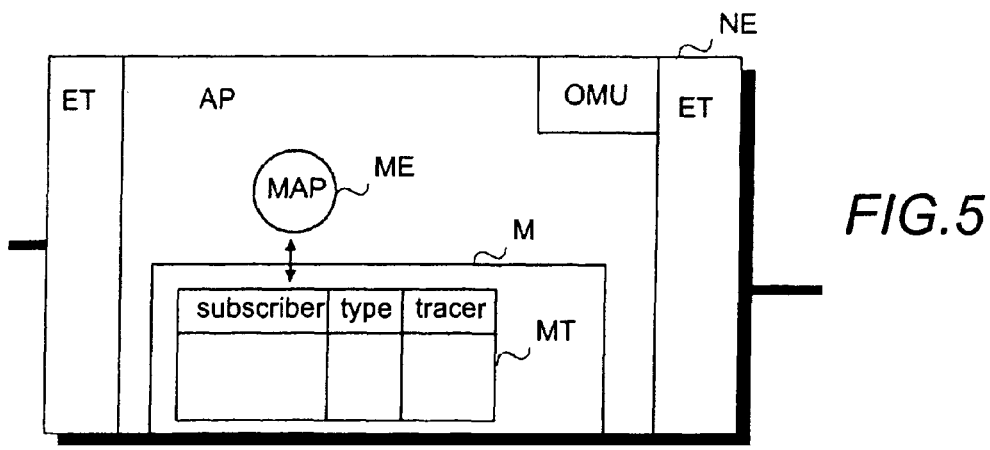
FIG. 5 is a block diagram of the element according to the first preferred embodiment of the invention.

FIG. 5 illustrates a network element NE of the invention, such as a mobile switching centre, home location register or visitor location register according to the GSM system. The network element comprises terminals ET for receiving messages from and transmitting messages to other network nodes, an application part AP, which controls the network element, memory M and operation and maintenance unit OMU for receiving commands and instructions from the operator and for answering them. The network element receives the trace command, among other things, via the operation and maintenance unit.

The application part AP comprises different protocol entities, such as an MAP entity ME which transmits MAP services. The MAP entity ME transmits all MAP services of the network element, i.e. all MAP signalling messages are transmitted under the control of the MAP entity. In the first preferred embodiment of the invention the MAP entity carries out the procedures related to tracing in the network element. These procedures were described in greater detail in connection with FIGS. 3 and 4. In another embodiment these procedures may be carried out by another entity, e.g. an entity of the lower protocol layers or an application entity to be run above the MAP. Procedures may also be divided between different entities. When tracing is carried out at the MAP level, i.e. the MAP entity is responsible for that, the implementation is simpler because at the MAP level information processing is related to the subscriber. A further advantage is that tracing signalling described in FIG. 3 may be regarded as part of the MAP protocol.

In the first preferred embodiment the memory of the network element comprises a monitoring table MT, which preferably contains information on the subscribers whose signalling messages are to be traced and information on the tracer, i.e. the address to which copied messages are sent. The monitoring table may also include information on the type of the messages to be traced. If this information is not available, it is assumed that all messages related to the subscriber are to be traced. The information of the monitoring table can be maintained by the OMU or by the MAP entity ME or by both of them. When the network element receives a trace command, the unit maintaining the monitoring table adds the necessary information to the table. If it is told in the trace command that several subscribers should be traced so that each subscriber is identified separately, the data on each subscriber are added to the monitoring table as if the data were received in separate trace commands. If the trace command identifies a number of subscribers as a single group, e.g. as a group consisting of subscribers having a telephone number beginning with a certain sequence of digits, the data are added as if only one subscriber were involved. Two tracers may be related to the same subscriber, and thus the desired messages may be of the same type or completely different. For example, one of the trace commands related to the same subscriber at the same time may be a command according to which signalling messages related to a mobile-terminating short message are to be sent to the mechanic by to the network element via the operation and maintenance unit OMU. In the other trace command all signalling messages related to the subscriber are copied into the memory of the network element. The information is stored in the monitoring table so that the right tracer receives copies of the correct messages related to the right subscriber or subscribers. In the embodiments where tracing is stopped in response to a stop command, the maintenance unit deletes the subscribers indicated in the stop command as well as information on them from the monitoring table. In the embodiments where tracing is performed one dialogue at a time the information related to the subscriber to be traced is deleted from the monitoring table after the dialogue has ended.

In the first preferred embodiment of the invention a dialogue list (not shown) mentioned in connection with FIG. 4 is also stored in the memory M, i.e. a list on the dialogues to be traced which is used for monitoring on-going dialogues. This list is preferably maintained by the MAP entity ME. If the command to stop tracing is received in the middle of an on-going dialogue, the dialogue is not monitored till its end in the first preferred embodiment of the invention, but the dialogue related to the subscriber is deleted from the dialogue list because of the stop trace command. In another embodiment copying and sending of copied messages are not stopped until the dialogue that was possibly going on when the stop command was received ends.

The saving format of information described above is only an example. In other embodiments it is possible to use different data structures and ways of storing information. It is essential that information is available on the subscriber to be traced and the tracer.

It is to be understood that the above description and the figures related to it are only intended to illustrate the present invention. It will be obvious to a person skilled in the art that the invention may be modified in different ways without deviating from the scope and spirit of the invention disclosed in the appended claims.

The invention claimed is:

1. A method, comprising:
   receiving a signaling message in a functional entity for subscriber mobility management in a mobile communication system;
   receiving a trace command, the trace command identifying at least one subscriber whose signaling messages are to be traced and identifying a tracer to which information obtained during tracing is sent;
   receiving a start message of a dialogue;
   in response to receiving the start message, determining whether the dialogue is related to the subscriber to be traced; and
   in response to determining that the dialogue is related to the subscriber to be traced, adding the dialogue to a list of traced dialogues,
   where determining that the signaling message is related to the at least one subscriber comprises: determining whether the signaling message belongs to a traced dialogue on the list of traced dialogues; and
   in response to determining that the signaling message is related to the at least one subscriber, sending, from the functional entity to the tracer, a copy of the signaling message, wherein the copy of the signaling message sent to the tracer is identical to the received signaling message.

2. The method according to claim 1, wherein the trace command also indicates the type of the signaling messages to be traced, and the method further comprises:
   determining whether the signaling message is of the type to be traced, where the copy of the signaling message is sent only if the signaling message is of the type to be traced.

3. The method according to claim 1, further comprising:
   in response to determining that the signaling message belongs to the traced dialogue, determining whether the signaling message stops the traced dialogue; and
   in response to determining that the signaling message stops the traced dialogue, removing the traced dialogue from the list of traced dialogues.

4. The method according to claim 1, further comprising:
   receiving a stop command of tracing in the entity, the stop command indicating the subscriber whose signaling message tracing is to be stopped, and
   stopping tracing of the signaling messages related to said subscriber.

5. The method according to claim 1, wherein the signaling messages of the MAP protocol are traced.

6. An apparatus, comprising at least one processor; and at least one memory including computer program code, the at least one memory and the computer program code configured to, with the at least one processor, cause the apparatus to perform at least the following:
   to receive a trace command, the trace command identifying at least one subscriber whose signaling messages are to be traced and identifying a tracer to which information obtained during tracing is sent;
   to receive a signaling message;
   to receive a start message of a dialogue;
   in response to receiving the start message, to determine whether the dialogue is related to the subscriber to be traced; and
   in response to determining that the dialogue is related to the subscriber to be traced, to add the dialogue to a list of traced dialogues,
   where, when determining that the signaling message is related to the at least one subscriber, the at least one memory and the computer program code are further configured to cause the apparatus to determine whether the signaling message belongs to a traced dialogue on the list of traced dialogues; and
   in response to determining that the signaling message is related to the at least one subscriber, to send, from the functional entity to the tracer, a copy of the signaling message, wherein the copy of the signaling message sent to the tracer is identical to the received signaling message.

7. The apparatus according to claim 6, wherein the trace command also indicates the type of signaling messages to be traced, and the at least one memory and the computer program code are further configured to cause the apparatus to perform at least the following:
   to determining whether the signaling message is of the type to be traced, where the copy of the signaling message is sent only if the signaling message is of the type to be traced.

8. The apparatus according to claim 6, where the at least one memory and the computer program code are further configured to cause the apparatus to perform at least the following:
   in response to determining that the signaling message belongs to the traced dialogue, to determine whether the signaling message stops the traced dialogue; and
   in response to determining that the signaling message stops the traced dialogue, to remove the traced dialogue from the list of traced dialogues.

9. The apparatus according to claim 6, where the at least one memory and the computer program code are further configured to cause the apparatus to perform at least the following:
   to receive a stop command of tracing in the entity, the stop command indicating the subscriber whose signaling message tracing is to be stopped, and
   to stop tracing of the signaling messages related to said subscriber.

10. The apparatus according to claim 6, wherein the signaling messages of the MAP protocol are traced.

11. A non-transitory computer readable medium tangibly encoded with a computer program executable by a processor to perform actions comprising:
    receiving a trace command, the trace command identifying at least one subscriber whose signaling messages are to be traced and identifying a tracer to which information obtained during tracing is sent;
    receiving a signaling message;
    receiving a start message of a dialogue;
    in response to receiving the start message, determining whether the dialogue is related to the subscriber to be traced; and
    in response to determining that the dialogue is related to the subscriber to be traced, adding the dialogue to a list of traced dialogues, where determining that the signaling message is related to the at least one subscriber comprises: determining whether the signaling message belongs to a traced dialogue on the list of traced dialogues; and in response to determining that the signaling message is related to the at least one subscriber, sending, from the functional entity to the tracer, a copy of the signaling message, wherein the copy of the signaling message sent to the tracer is identical to the received signaling message.

12. The computer readable medium according to claim 11, wherein the trace command also indicates the type of signaling messages to be traced, and the actions further comprise:

determining whether the signaling message is of the type to be traced, where the copy of the signaling message is sent only if the signaling message is of the type to be traced.

13. The non-transitory computer readable medium according to claim 11, wherein the actions further comprise:

in response to determining that the signaling message belongs to the traced dialogue, determining whether the signaling message stops the traced dialogue; and in response to determining that the signaling message stops the traced dialogue, removing the traced dialogue from the list of traced dialogues.

14. The non-transitory computer readable medium according to claim 11, wherein the actions further comprise:

receiving a stop command of tracing in the entity, the stop command indicating the subscriber whose signaling message tracing is to be stopped, and stopping tracing of the signaling messages related to said subscriber.

15. The non-transitory computer readable medium according to claim 11, wherein the signaling messages of the MAP protocol are traced.

16. An apparatus, comprising: means for receiving a trace command, the trace command identifying at least one subscriber whose signaling messages are to be traced and identifying a tracer to which information obtained during tracing is sent;

means for receiving a signaling message in a functional entity for subscriber mobility management in a mobile communication system;

means for receiving a start message of a dialogue;

means for determining whether the dialogue is related to the subscriber to be traced in response to receiving the start message;

means for adding the dialogue to a list of traced dialogues in response to determining that the dialogue is related to the subscriber to be traced; and means for determining that the signaling message is related to the at least one subscriber, which comprise: means for determining whether the signaling message belongs to a traced dialogue on the list of traced dialogues; and means for sending, from the functional entity to the tracer, a copy of the signaling message in response to determining that the signaling message is related to the at least one subscriber, wherein the copy of the signaling message sent to the tracer is identical to the received signaling message.

* * * * *